United States Patent
Hensley et al.

(10) Patent No.: US 10,417,212 B1
(45) Date of Patent: Sep. 17, 2019

(54) DATABASE MODIFICATION REPLAY

(71) Applicant: QAD, Inc., Santa Barbara, CA (US)

(72) Inventors: John Alan Hensley, Raleigh, NC (US);
Wouter Cordewiner, Ghent (BE);
Robert K Oliver, Raleigh, NC (US);
Carlo Innocenti, Wakefield, MA (US);
Marc Van Cappellen, Meise (BE)

(73) Assignee: QAD, Inc., Santa Barbara, CA (US)

( * ) Notice: Subject to any disclaimer, the term of this patent is extended or adjusted under 35 U.S.C. 154(b) by 824 days.

(21) Appl. No.: 14/995,019

(22) Filed: Jan. 13, 2016

Related U.S. Application Data (60) Provisional application No. 62/103,866, filed on Jan. 15, 2015.

(51) Int. Cl.
*G06F 16/00* (2019.01)
*G06F 16/23* (2019.01)
*G06F 16/21* (2019.01)
*G06F 16/16* (2019.01)
*G06F 16/2455* (2019.01)

(52) U.S. Cl.
CPC ............ *G06F 16/23* (2019.01); *G06F 16/162* (2019.01); *G06F 16/21* (2019.01); *G06F 16/24565* (2019.01)

(58) Field of Classification Search
CPC ..... Y10S 707/99951; Y10S 707/99954; G06F 17/30368; G06F 17/30371
See application file for complete search history.

(56) References Cited

U.S. PATENT DOCUMENTS

| | | | | |
|---|---|---|---|---|
| 6,463,439 B1 * | 10/2002 | Dahlberg | .......... | G06F 17/30306 707/624 |
| 7,970,742 B2 * | 6/2011 | Hanckel | ............ | G06F 17/30551 707/673 |
| 9,384,222 B2 * | 7/2016 | Banerjee | .......... | G06F 17/30306 |
| 2002/0087271 A1 * | 7/2002 | Rozenshtein | ..... | G06F 17/30368 702/1 |
| 2007/0130171 A1 * | 6/2007 | Hanckel | ............ | G06F 17/30551 |
| 2008/0098045 A1 * | 4/2008 | Radhakrishnan | ........................... G06F 17/30551 |
| 2009/0182746 A1 * | 7/2009 | Mittal | ............... | G06F 17/30362 |

* cited by examiner

*Primary Examiner* — Cheryl Lewis
(74) *Attorney, Agent, or Firm* — Stradley Ronon Stevens & Young, LLP (57) ABSTRACT

A system and method for providing database replay are disclosed. In one embodiment, the system detects a trigger; obtains updated data from a read-only table; stores the updated data in a modifiable table; retrieves a modification history including a comprehensive and persistent record of the changes made to one or more earlier versions of the modifiable table; and applies the modifications indicated in the modification history to the updated data stored in the modifiable table.

18 Claims, 5 Drawing Sheets

DATABASE MODIFICATION REPLAY

CROSS REFERENCE TO RELATED APPLICATIONS

The present application claims priority, under 35 U.S.C. § 119, of U.S. Provisional Patent Application No. 62/103,866, filed Jan. 15, 2015 and entitled "Data Modification Replay," which is incorporated by reference in its entirety.

FIELD OF INVENTION

The specification relates to databases. In particular, the specification relates to generating a writeable copy of a read-only database and updates thereto.

BACKGROUND

In some instances, it may be desirable to apply custom changes to an existing, read-only database table to make it more suitable for a specific business use. Typically, the original read-only database table will be copied into a writeable database to which the necessary custom changes will be applied without affecting the contents in the original read-only database table.

If information in the original read-only database table is dynamic and therefore changes over time, it becomes necessary to repeat the process of copying the original read-only database table into a writeable database and then applying the necessary custom changes to the updated table by executing database update statements. Existing systems may accomplish this using scripting tools to automate the process of copying the read-only database table into a writeable database and then performing the necessary updates to the writeable database using database update statements. Should it become necessary to apply additional changes to the writeable database dataset at some time in the future, it would be necessary to update the scripts to include the additional database update statement and then run the update scripts to perform the task of copying the read-only database table into a writeable database and then perform the necessary updates to the writeable database.

Present systems fail to copy a read-only database table to a writeable database, record all database updates statements that are executed to modify the writeable database table and later, when the original read-only database table changes, replace the writeable database with the updated read-only database table and replay the previously recorded updated statements on the updated writeable database table.

SUMMARY

In general, an innovative aspect of the subject matter described in this disclosure may be embodied in methods that include detecting, using one or more processors, a trigger; obtaining, using one or more processors, updated data from a read-only table; storing, using one or more processors, the updated data in a modifiable table; retrieving, using one or more processors, a modification history including a comprehensive and persistent record of the changes made to one or more earlier versions of the modifiable table; and applying, using one or more processors, the modifications indicated in the modification history to the updated data stored in the modifiable table.

According to another innovative aspect of the subject matter described in this disclosure, a system comprises a processor; and a memory storing instructions that, when executed, cause the system to: detect a trigger; obtain updated data from a read-only table; store the updated data in a modifiable table; retrieve a modification history including a comprehensive and persistent record of the changes made to one or more earlier versions of the modifiable table; and apply the modifications indicated in the modification history to the updated data stored in the modifiable table.

Other implementations of one or more of these aspects include corresponding systems, apparatus, and computer programs, configured to perform the actions of the methods, encoded on computer storage devices. These and other implementations may each optionally include one or more of the following features.

For instance, the operations further include receiving a request to modify the data in the modifiable table; applying the requested modification to change the data in the modifiable table; and recording the modification in the modification history. For instance, the modification history is a database table separate from the modifiable table in a database. For instance, the modifiable table uses structured query language and the changes made to the one or more earlier versions of the modifiable table include one or more of an insert statement, a delete statement and a modify statement. For instance, the trigger includes a modification to the read-only table. For instance, the trigger includes a user initiated request to obtain updated data from the read-only table. For instance, the trigger includes an expiration of a predetermined time period. For instance, the operations further include responsive to detecting the trigger, locking a previous version of the modifiable table; creating the modifiable table; responsive to applying the modifications indicated in the modification history to the updated data stored in the modifiable table, deleting the previous version of the modifiable table; and renaming the modifiable table to have the same name as the previous version of the modifiable table, wherein storing the updated data in the modifiable table includes copying all rows of data from the read-only table into the modifiable table. For instance, locking the previous version of the modifiable table permits data to be read from the previous version of the modifiable table but prevents further modification of the previous version of the modifiable table. For instance, the modifiable table, subsequent to the modifiable table being renamed, is an unlocked table and requests for modification are applied to the data of the modifiable table.

It should be understood that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Example System

Figure 1:
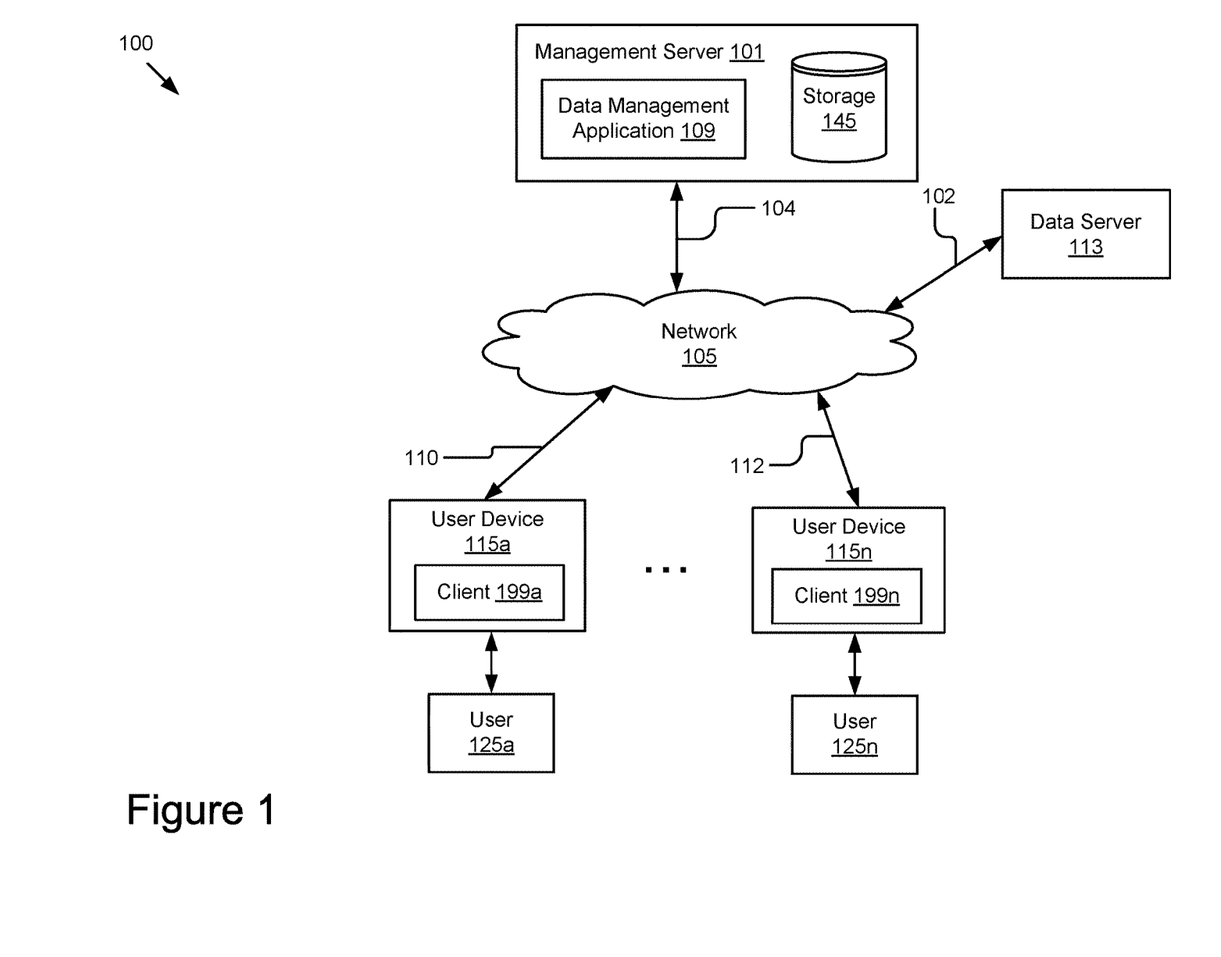
FIG. 1 is a block diagram illustrating an example system for replaying modifications made to a modifiable copy of a read-only database table from a modification history according to one embodiment.

FIG. 1 illustrates a block diagram of an example of a system 100 for replaying modifications made to a modifiable copy of a read-only database table from a modification history according to one embodiment. The illustrated system 100 includes a management server 101, one or more data servers 113, one or more user devices 115a . . . 115n (referred to collectively or individually as "user device 115") and one or more users 125a . . . 125n (referred to collectively or individually as "user 125").

In the illustrated implementation, the entities of the system 100 are communicatively coupled to each other. For example, the management server 101 is communicatively coupled to the network 105 via signal line 104. The data server 113 is communicatively coupled to the network 105 via signal line 102. The user device 115a is communicatively coupled to the network 105 via signal line 110. The user device 115n is communicatively coupled to the network 105 via signal line 112.

The network 105 may be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some implementations, the network 105 may be a peer-to-peer network. The network 105 may also be coupled to or includes portions of a telecommunications network for sending data in a variety of different communication protocols. In some implementations, the network 105 includes Bluetooth communication networks or a cellular communications network for sending and receiving data including via short messaging service (SMS), multimedia messaging service (MMS), hypertext transfer protocol (HTTP), direct data connection, WAP, email, etc. Although only one network 105 is illustrated in FIG. 1, FIG. 1 may include one or more networks 105.

The data exchanged over the network 105 may be represented using technologies and/or formats including the hypertext markup language (HTML), the extensible markup language (XML), JavaScript Object Notation (JSON), Binary JavaScript Object Notation (BSON), Comma Separated Values (CSV), etc. In addition, all or some of links may be encrypted using conventional encryption technologies, for example, the secure sockets layer (SSL), Secure Hypertext Transfer Protocol (HTTPS) and/or virtual private networks (VPNs) or Internet Protocol security (IPsec). In another embodiment, the entities may use custom and/or dedicated data communications technologies instead of, or in addition to, the ones described above. Depending upon the embodiment, the network 105 may also include links to other networks.

The data server 113 may be any class of data server including, for example, a SaaS application, packaged on-premise application, relational application, data warehouse, etc. In one embodiment, the data server 113 may include one or more computing devices having data processing, storing, and communication capabilities. For example, the data server 113 may include one or more hardware servers, server arrays, storage devices, systems, etc., and/or may be centralized or distributed/cloud-based. In some implementations, the data server 113 may include one or more virtual servers, which operate in a host server environment and access the physical hardware of the host server including, for example, a processor, memory, storage, network interfaces, etc., via an abstraction layer (e.g., a virtual machine manager). While one data server 113 is illustrated, the system 100 may include any number of data servers 113.

The data server 113 stores data associated with one or more users 125. For example, the data server 113 is associated with a web service such as Salesforce, Eloqua, Hubspot, Aprimo, Marketo, Sugar CRM, Oracle's RightNow, Microsoft Dynamics, Hadoop, Hive, Amazon DynamoDB, Google Bigtable, PostgreSQL, Enterprise DB, Microsoft SQL Azure, Amazon RDS, Salesforce's database.com, Redis, Cassandra, MongoDB, CouchBase, HBase, Impala, SuccessFactors, Taleo, ADP, Workday, Intacct, Concur, NetSuite, SAP Business by Design, QAD, Infor, SAP HANA, OData, or any other web service that stores data associated with a user 125.

The management server 101 may include one or more computing devices having data processing, storing, and communication capabilities. For example, the management server 101 may include one or more hardware servers, server arrays, storage devices, systems, etc., and/or may be centralized or distributed/cloud-based. In some implementations, the management server 101 may include one or more virtual servers, which operate in a host server environment and access the physical hardware of the host server including, for example, a processor, memory, storage, network interfaces, etc., via an abstraction layer (e.g., a virtual machine manager). In one embodiment, the management server 101 includes a data management application 109 and a storage device 145. While one management server 101 is illustrated, the system 100 may include one or more management servers 101.

The user device 115 is a computing device having data processing and communication capabilities. While FIG. 1 illustrates two user devices 115, the present specification applies to any system architecture having one or more user device 115. In some embodiments, a user device 115 may include a processor (e.g., virtual, physical, etc.), a memory, a power source, a network interface, and may include other components whether software or hardware, such as a display, graphics processor, wireless transceivers, input devices (e.g. mouse, keyboard, camera, sensors, etc.) firmware, operating systems, drivers, various physical connection interfaces (e.g., USB, HDMI, etc.). The user device 115 may couple to and communicate with one another and the other entities of the system 100 via the network 105 using a wireless and/or wired connection.

Examples of types of user device 115 include a laptop computer, a desktop computer, a tablet computer, a mobile telephone, a personal digital assistant (PDA), a mobile email device, a portable game player, a portable music player, a reader device, a television with one or more processors embedded therein or coupled thereto or any other electronic device capable of accessing a network 105. In addition, user devices 115 may be the same or different types of user device 115.

In one implementation, the user device 115 include a client 199. For example, the client 199 is a web client (e.g.

a web browser such as Mozilla Firefox, Google Chrome, Microsoft Internet Explorer, Opera, Safari, etc.) configured to communicate with the data management application 109 via the network 105. In another example, the client 199 is a mobile client (e.g. that works on one or more of Android, iOS, Windows 8, Blackberry, or any other mobile operating system) configured to communicate with the data management application 109 via the network 105. In another example, the client 199 is a desktop client (e.g. that works on a Windows, Mac, Linux, or any other operating system) configured to communicate with the data management application 109 via the network 105. In another implementation, the user device 115 includes a driver (not shown) (e.g. Open Database Connectivity (ODBC) driver, a Java Database Connectivity Driver (JDBC) driver, an ADO.NET driver, an Open Link and Embedded Database (OLEDB) driver or any other driver) configured to communicate with the data management application 109 via the network 105.

A user 125 interacts with the user device 115. For example, the user 125 interacts with the user device 115 to request modification of the data in the modifiable table. The user device 115 or data server 113 may communicate with the management server 101 using one or more of a client 199 and a driver (not shown). For example, the user device 115 may communicate with the management server 101 using one or more of an Open Database Connectivity (ODBC) driver, a Java Database Connectivity Driver (JDBC) driver, an ADO.NET driver, an Open Link and Embedded Database (OLEDB) driver or any other driver.

It should be understood that the system 100 illustrated in FIG. 1 is representative of an example system for replaying modifications made to a modifiable copy of a read-only database table from a modification history according to one embodiment and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system 100 may be integrated into to a single computing device or system or additional computing devices or systems may be included.

Figure 2:
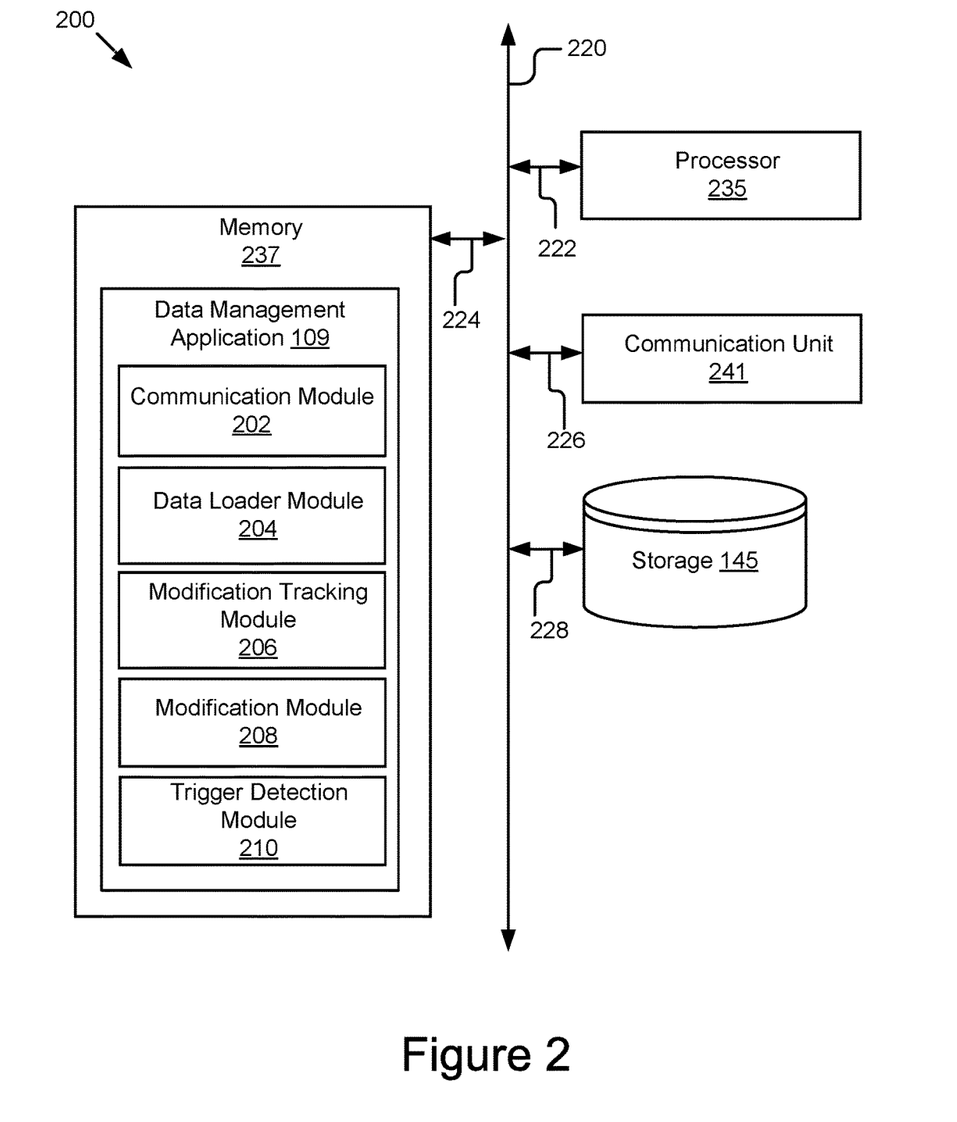
FIG. 2 is a block diagram illustrating an example computing device and example data management application according to one embodiment.

Referring now to FIG. 2, FIG. 2 is a block diagram of an example computing device 200 that includes a data management application 109, a processor 235, a memory 237, a communication unit 241 and a storage device 145 according one embodiment. In one embodiment, the management server 101 is a computing device 200. The components of the computing device 200 are communicatively coupled by a bus 220. In some implementations, the computing device 200 may be one of any processor-based computing device such as a computer, server, mainframe, etc.

The processor 235 is communicatively coupled to the bus 220 via signal line 222. The memory 237 is communicatively coupled to the bus 220 via signal line 224. The communication unit 241 is coupled to the bus 220 via signal line 226. The storage 145 is communicatively coupled to the bus via signal line 228.

The processor 235 may include an arithmetic logic unit, a microprocessor, a general purpose controller or some other processor array to perform computations and provide electronic display signals to a display device. The processor 235 is coupled to the bus 220 for communication with the other components via signal line 222. Processor 235 processes data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors (not shown) may be included. Other processors, operating systems, sensors, displays and physical configurations are possible.

The memory 237 stores instructions and/or data that may be executed by the processor 235. The memory 237 is coupled to the bus 220 for communication with the other components via signal line 224. The instructions and/or data may include code for performing the techniques described herein. For example, in the illustrated embodiment, the memory 237 stores the data management application 109, which is executed by the processor 235. In another embodiment, the data management application 109 is stored in storage 145, loaded into the memory 237 and executed by the processor 235.

The memory 237 includes a non-transitory computer-usable (e.g., readable, writeable, etc.) medium, which may be any apparatus or device that may contain, store, communicate, propagate or transport instructions, data, computer programs, software, code, routines, etc., for processing by or in connection with the processor 235. In some embodiments, the memory 237 may include one or more of volatile memory and non-volatile memory. For example, the memory 237 may include, but is not limited, to one or more of a dynamic random access memory (DRAM) device, a static random access memory (SRAM) device, flash memory or some other memory device. In some implementations, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. It should be understood that the memory 237 may be a single device or may include multiple types of devices and configurations.

The communication unit 241 transmits and receives data to and from at least one of the user device 115 and the data server 113. The communication unit 241 is coupled to the bus 220 via signal line 226. In some implementations, the communication unit 241 includes a port for direct physical connection to the network 105 or to another communication channel. For example, the communication unit 241 includes a USB, SD, CAT-5 or similar port for wired communication with the user device 115. In some implementations, the communication unit 241 includes a wireless transceiver for exchanging data with the user device 115 or other communication channels using one or more wireless communication methods, including IEEE 802.11, IEEE 802.16, BLUETOOTH® or another suitable wireless communication method.

In some implementations, the communication unit 241 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some implementations, the communication unit 241 includes a wired port and a wireless transceiver. The communication unit 241 also provides other conventional connections to the network 105 for distribution of files and/or media objects using standard network protocols including TCP/IP, HTTP, HTTPS and SMTP, etc.

The storage device 145 may be a non-transitory memory that stores data for providing the functionality described herein. The storage device 145 may be a dynamic random access memory (DRAM) device, a static random access memory (SRAM) device, flash memory or some other memory devices. In some implementations, the storage device 145 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. In the illustrated implementation, the storage device 145 is communicatively coupled to the bus 220 via signal line 228. In one embodiment, the storage 145 stores instructions and/or data that may be used by the data management application 109. The instructions and/or data may include code for performing the techniques described herein. In one embodiment, the storage 145 stores data imported from the data server 113. For example, in one embodiment, storage 145 stores data obtained from a read-only database table of the data server 113 as a modifiable table. In one embodiment, the storage 145 includes a modification history described below.

Example Data Management Application 109

The data management application 109 is an element of the system 100 for replaying modifications made to a modifiable copy of a read-only database table from a modification history. The data management application 109 according to some embodiments beneficially maintains a modification history and uses the modification history to provide "replay" of modifications made to a modifiable copy of a read-only database automatically without using scripts or having to manually update scripts.

In the illustrated implementation shown in FIG. 2, the data management application 109 includes a communication module 202, a data loader module 204, a modification tracking module 206, a modification module 208 and a trigger module 210. It will be recognized that the modules 202, 204, 206, 208, 210, comprising the data management application 109 may not necessarily be on the same computing device 200. In one embodiment, the modules 202, 204, 206, 208, 210, and/or their functionality are distributed across multiple computing devices 200 (e.g. multiple management servers 101).

The communication module 202 includes code and routines for handling communications between the data management application 109 and other components of the computing device 200. In one embodiment, the communication module 202 is a set of instructions executable by the processor 235. In another embodiment, the communication module 202 is stored in the memory 237 and is accessible and executable by the processor 235. In either embodiment, the communication module 202 is adapted for cooperation and communication with the processor 235, other components of the management server 101 and other components of the data management application 109.

The communication module 202 handles communication between the data management application 109 and other components of the computing device 200. For example, in some embodiments, the communication module 202 may receive an indication that a trigger is detected from the trigger detection module 210 and pass that indication to the data loader module 204. For clarity and convenience, mention of the communication module 202 may often be omitted. For example, the above scenario may be described as the data loader module 204 receiving, from the trigger detection module 210, an indication that a trigger is detected.

In one embodiment, the communication module 202 handles communication between the data management application 109 and one or more data sources (e.g. one or more data servers 113) via communication unit 241. In one embodiment, the communication module 202 includes a driver library (not shown) including drivers for accessing data (e.g. read only database tables) on each of the data sources (e.g. one or more data servers 113) in the system 100 and provides connectivity for the data management application 109 to obtain data from the data sources. In one embodiment, the communication module 202 includes a universal driver (not shown) for connecting to a cloud-based data access service (not shown), and the cloud based data access service provides connectivity to one or more data sources in the system 100. In one embodiment, the data access service is Progress Software Corporation's DataDirect Cloud.

In one embodiment, the communication module 202 passes communications to and from the components of the data management application 109. In one embodiment, the communication module 202 stores communications in memory 237 (or any other non-transitory storage medium communicatively accessible), the components of the computing device 200 including, e.g., the data management application 109 may retrieve the communications by accessing the memory 237 (or other non-transitory storage medium).

The data loader module 204 includes code and routines for obtaining and storing data from a read-only table. In one embodiment, the data loader module 204 is a set of instructions executable by the processor 235. In another embodiment, the data loader module 204 is stored in the memory 237 and is accessible and executable by the processor 235. In either embodiment, the data loader module 204 is adapted for cooperation and communication with the processor 235, other components of the management server 101 and other components of the data management application 109.

For clarity and convenience, the read-only database table may be referred to herein as "read-only table," "table T0" or "T0." The modifiable database table may be referred to herein as the "modifiable table," "table T1" or "T1." For clarity and convenience, an example in which T0 is a table including contact information and maintained using Salesforce is occasionally referred to throughout this application. It should be recognized that this is merely one example and other examples of read-only tables and data sources exist.

In one embodiment, the data loader module 204 obtains access information for the existing, read-only database table. For example, the data loader module 204 obtains access information provided by the user 125 during a configuration process. Examples of access information may include, but are not limited to the name of table T0 (e.g. "contact info"), a file path to table T0, the URL of a web service that maintains table T0 (e.g. a URL associated with Salesforce), user account information (e.g. a user name and password), etc.

The data loader module 204 obtains data from a read-only database table and stores the data in a modifiable database table. In other words, in one embodiment, the data loader module 204 generates a modifiable copy of the read-only database table.

In one embodiment, the data loader module 204 obtains and stores data from a read-only table in a modifiable table in the first instance (e.g. upon completion of a configuration or set-up of the system 100) and responsive to one or more triggers. In one embodiment, the data loader module 204 obtains data from the read-only database table responsive to a trigger. For example, in one embodiment, the data loader module 204 receives an indication that a trigger has been detected by the trigger detection module 210 and, responsive to receiving that indication, begins obtaining and storing data from the read-only database.

The data that the data loader module 204 obtains from the read-only table responsive to a trigger is occasionally referred to as being "updated" or "updated data." However, it should be recognized that, depending on the embodiment and/or circumstances, the updated data may or may not be different to that previously obtained from T0. For example, assume in one embodiment a trigger is an expiration of a timer (i.e. elapsed time) and table T0 was not changed during the associated period of time, the data loader 204 obtains the updated data from T0 that is identical to the preceding data obtained from table T0. However, if table T0 had been changed in the preceding example, the updated data obtained from table T0 would be different from the data the data loader module 204 previously obtained from table T0.

In one embodiment, responsive to receiving an indication of a trigger event, the data loader module 204 instruct the modifiable database to lock table T1. In one embodiment, locking table T1 prevents modification (e.g. writing) to T1 while locked, but still allows data to be obtained (e.g. read) from T1. To summarize and simplify, in one embodiment, reads from T1 are permitted while T1 is locked but writes to T1 are not permitted while T1 is locked.

In one embodiment, responsive to receiving an indication of a trigger event, the data loader module 204 obtains the updated data from the read-only table, creates a new modifiable database table (e.g. named T1_NEW) with the same layout as the read-only table and stores the updated data in a new modifiable database table. For clarity and convenience, the new modifiable database table is occasionally referred to herein as new modifiable table, "table T1 NEW" or "T1 NEW."

In one embodiment, the data loader module 204 passes the modifiable database table to the modification module 208. In one embodiment, the data loader module 204 stores the modifiable database table in memory 237 (or other non-transitory storage medium communicatively accessible), and the other modules of the data management application 109 including, e.g., the modification module 208, may retrieve the integrated data set by accessing the memory 237 (or other non-transitory storage medium).

The modification tracking module 206 includes code and routines for recording modifications. In one embodiment, the modification tracking module 206 is a set of instructions executable by the processor 235. In another embodiment, the modification tracking module 206 is stored in the memory 237 and is accessible and executable by the processor 235. In either embodiment, the modification tracking module 206 is adapted for cooperation and communication with the processor 235, other components of the management server 101 and other components of the data management application 109.

The modification tracking module 206 records modifications to the modifiable table. The record of modifications to T1 may occasionally referred to herein as a "modification history." For example, assume the modifiable database is a structured query language (SQL) database and the user 125 via user device 115 executes SQL update, insert and delete statements in order to modify T1; in one embodiment, the modification module 208 executes those statements to modify T1, and the modification tracking module 206 records those SQL update, insert and delete statements. In one embodiment, the modification tracking module 206 records the modifications in a separate writeable database table occasionally referred to herein as "table MOD_T1" or "MOD_T1." For example, the modification tracking module 206 records the SQL update, delete and insert statements in table MOD_T1, and MOD_T1 is the modification history of table T1. For clarity and convenience, the present disclosure occasionally refers to an example using SQL. However, it should be recognized that SQL is merely one example of a query language and that the present disclosure may be applied to other query languages. For example, the present disclosure may be applied to not only SQL (NoSQL) T0 and T1 tables (e.g. graphical databases, etc.) and modifications (e.g. statements creating or deleting a node or relationship between nodes, etc.) may be recorded by the modification tracking module 206 according to one embodiment.

The modification tracking module 206 records the modification to preserve the order/sequence of modifications. For example, in one embodiment, the modification tracking module 206 records the modification and a time stamp associated with the receipt of the request for that modification. In another example, in one embodiment, the modification tracking module 206 records the modification and a row identifier associated with that recorded modification indicates that modifications position in the order/sequence of recorded modifications. It should be recognized that time stamps and row identifier are merely examples of ordering data to preserve the order of modifications recorded and that other ordering data exists.

In one embodiment, the modification tracking module 206 edits the modification history based on user input. For example, in one embodiment, the modification tracking module 206 generates graphical elements representing the modification history and the modifications therein when presented on the user device 115. The user may modify the record of modifications (e.g. delete modification statements, re-order modification statements, etc.) using the graphical interface according one embodiment. For example, assume T0 is a contact list maintained by Salesforce, which is loaded into T1 and a user requests that the word "avenue" be modified to be abbreviated to "Ave." for the addresses of all the contacts. Also, assume that at a later time it becomes undesirable to make such a modification. In one embodiment, the modification tracking module 206 generates a graphical representation of the modification history and, responsive to a user selecting to remove the modification changing "avenue" to "Ave.," the modification tracking module 206 removes the modification from the modification history (e.g. deletes the associated query from MOD_T1).

In another embodiment, the modifications record is perpetual and entries therein are not modifiable. For example, in one such embodiment, referring to the preceding example, the user may request a new modification to change instances of "Ave." to "avenue," and the modification tracking module 206 would record that new modification in MOD_T1 so that MOD_T1 includes a record of "avenue" to "Ave." and "Ave." to "avenue" and their relative sequence.

In one embodiment, the modification tracking module 206 may apply a filter to a modification to determine whether to record the requested modification. Examples of filters may include, but are not limited to, filters based on the type of modification (e.g. update, delete, etc.), a user, the portion of T1 being modified (e.g. modifications to data stored in a certain column of T1, in one embodiment, may not be recorded in the modification history even when the data is modified in the present version of table T1), an indication that the query is not to be recorded (e.g. a query from a certain interface), etc.

In one embodiment, the modification tracking module 206 passes the modification history to the modification module 208. In one embodiment, the modification tracking module 206 stores the modification history in memory 237 (or any other non-transitory storage medium communicatively accessible) and the modification module 208 may retrieve the modification history.

The modification module 208 includes code and routines for implementing modifications to data. In one embodiment, the modification module 208 is a set of instructions executable by the processor 235. In another embodiment, the modification module 208 is stored in the memory 237 and is accessible and executable by the processor 235. In either embodiment, the modification module 208 is adapted for cooperation and communication with the processor 235, other components of the management server 101 and other components of the data management application 109.

The modification module 208 implements modifications to the data stored in the modifiable database table (e.g. stored in memory 237 or any other non-transitory storage medium communicatively accessible). Implementing a modification may occasionally be referred to herein as applying a modification. In one embodiment, the modification module 208 implements modifications based on one or more of user request to modify data and a modification history. In one embodiment, the modification module 208 implements modifications to the data stored in the modifiable database table based on a user request. For example, when the user requests to modify the data in table T1 (e.g. using a SQL update query), the modification module 208 implements the modification to table T1 (e.g. executes the SQL update query) and the modification tracking module 208 records the modification (e.g. the SQL update query) in table MOD_T1.

In one embodiment, the modification module 208 implements modifications based on the modification history. For example, assume the trigger detection module 210 detects a trigger and, responsive to detecting the trigger the data loader module 204 obtains updated data from the read-only table, T0, and stores the data in a new modifiable table, T1_NEW. In one embodiment, the modification module 208 retrieves or otherwise acquires the modification history, MOD_T1, and "replays" (i.e. applies the modifications indicated in the modification history in order) and, upon completing the modifications indicated by the modification history, renames table T1_NEW to have the name of table T1 and, depending on the embodiment, removes the lock on table T1. It should be recognized that this new version of table T1 beneficially includes the updated data from the read-only table and the modifications that were made to the previous version of table T1 without the use of a script or a user manually updating and maintaining the script.

It should further be recognized that the modification history is distinguishable from data structures used for database failover for at least two reasons—comprehensiveness and persistence. While a failover system may maintain some sort of a modification record (e.g. a SQL delete query) long enough to make sure that the modification (e.g. the deletion) is executed and propagated through the system properly even when a failure occurs in that system; however, that record does not persist for much longer than necessary to achieve that goal before being deleted or overwritten. The modifications recorded in the modification history, however, may persist indefinitely (unless edited in an embodiment providing such functionality) and even persist after table T1 (or at least the version of table T1 initially modified) no longer exists because, for example, it is replaced by a new version of table T1. Since the modifications are persistent, the modification history is a comprehensive record of the modifications (except those filtered out or edited out by the user in certain embodiments) made to the present version of table T1 and preceding versions of table T1.

The trigger detection module 210 includes code and routines for detecting a trigger. In one embodiment, the trigger detection module 210 is a set of instructions executable by the processor 235. In another embodiment, the trigger detection module 210 is stored in the memory 237 and is accessible and executable by the processor 235. In either embodiment, the trigger detection module 210 is adapted for cooperation and communication with the processor 235, other components of the management server 101 and other components of the data management application 109.

The trigger detection module 210 detects a trigger. In one embodiment, the trigger detection module 210 sends an indication that a trigger is detected to the data loader module 204, and the data loader module 204 obtains and stores data from the read-only database table responsive to receiving the notification. Thus, in one embodiment, the data loader module 204 obtains data from the read-only database table responsive to detecting a trigger.

Depending on the embodiment, one or more triggers may be detected. Examples of triggers may include, but are not limited to a user request, a time event and an updated read-only table. In one embodiment, the trigger detection module 210 detects a user request as a trigger. For example, assume a user 125 selects an "update" button on a GUI presented by a user device 115; in one embodiment, the trigger detection module 210 detects this selection as a trigger. In one embodiment, the trigger detection module 210 detects a time event. For example, assume a timer (e.g. set by the data loader module 204 upon obtaining and storing data from the read-only database table successfully) expires; in one embodiment, the trigger detection module 210 detects the expiration of the timer as a trigger. In one embodiment, the trigger detection module 210 detects a new read-only table. For example, assume the read-only table is replaced with a new read-only table (e.g. an updated read-only table); in one embodiment, the trigger detection module 210 detects the new read-only table as a trigger.

In one embodiment, the trigger detection module 210 passes the indication to the data loader module 204. In one embodiment, the trigger detection module 210 stores the indication in memory 237 (or other non-transitory storage medium communicatively accessible), and the data loader module 204 may retrieve the indication by accessing the memory 237 (or other non-transitory storage medium).

Example Methods

Figure 3:
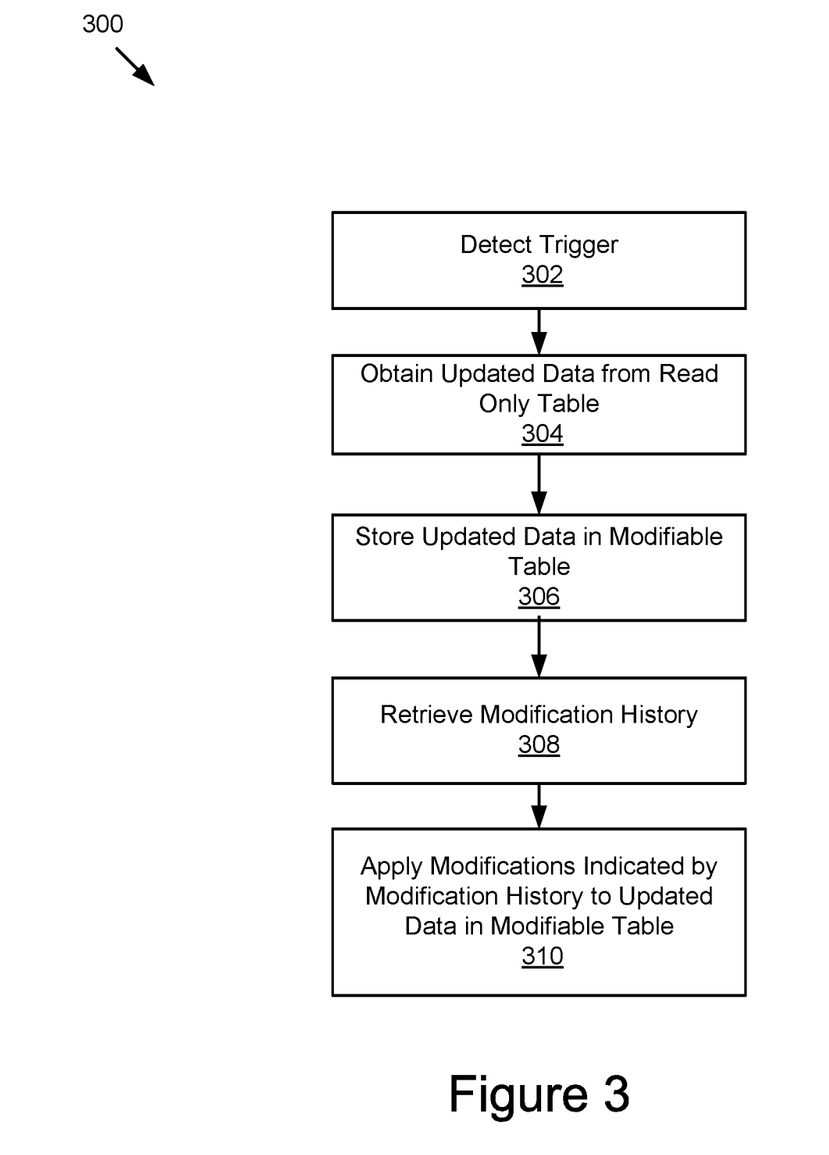
FIG. 3 is a flowchart of an example method for replaying modifications from a modification history according to one embodiment.
Figure 4:
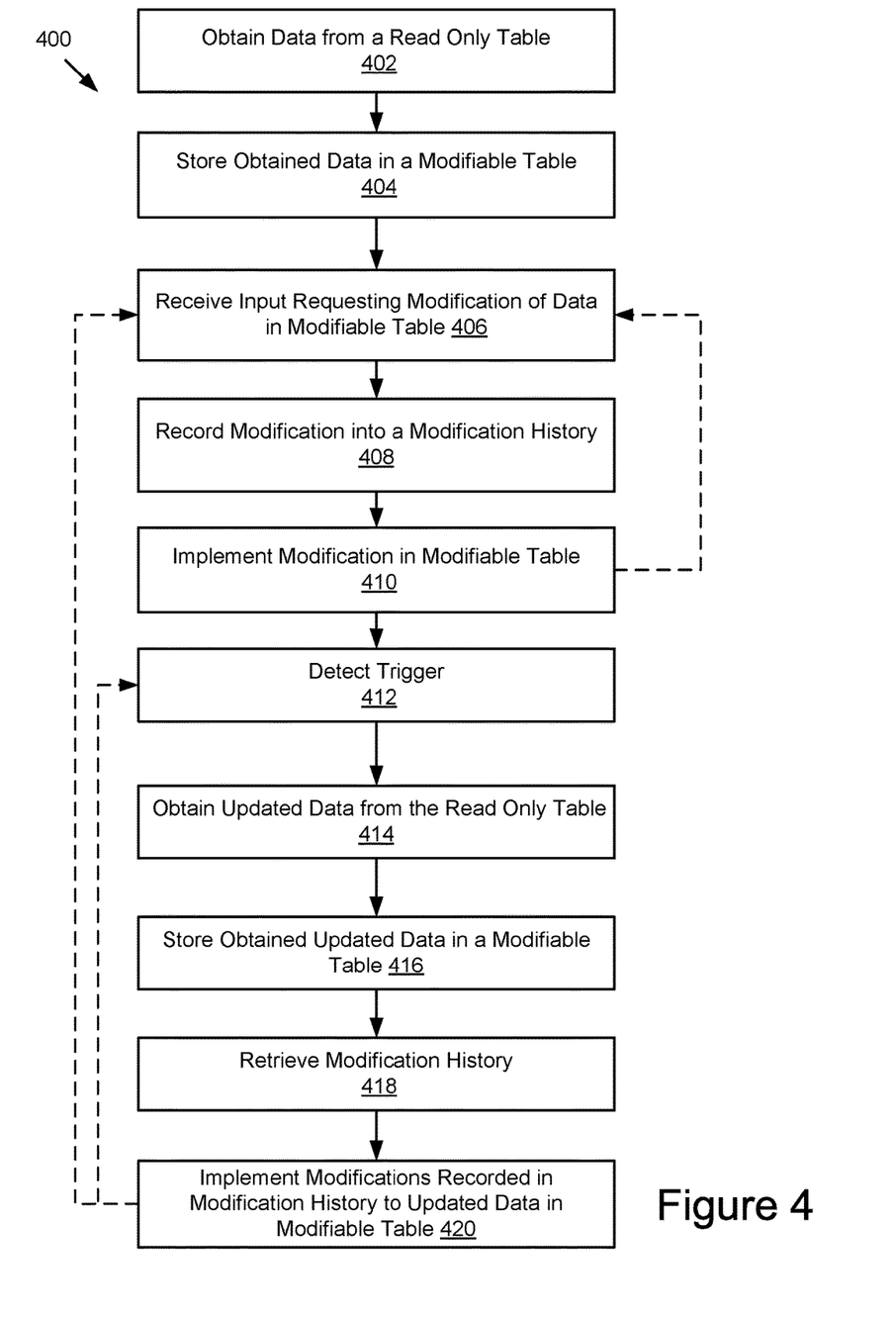
FIG. 4 is a flow chart of an example method for replaying modifications from a modification history according to another embodiment.
Figure 5:
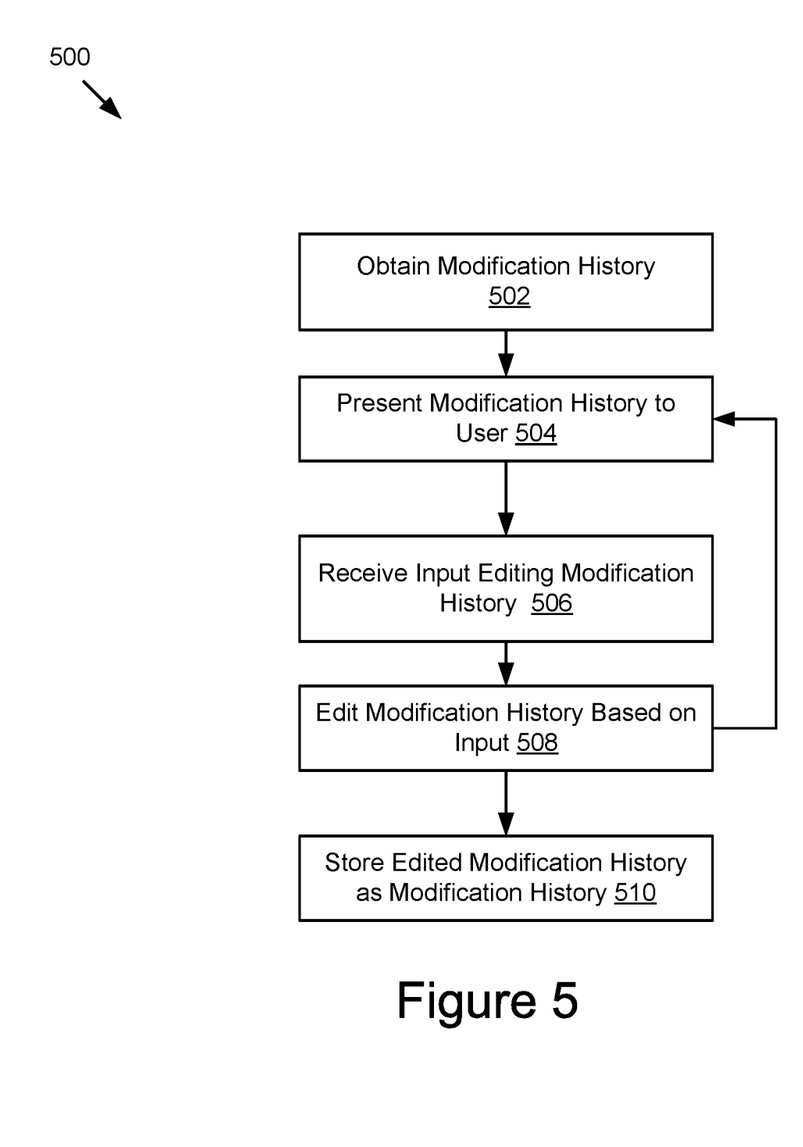
FIG. 5 is a flow chart of an example method for editing a modification history according to another embodiment.

FIGS. 3-5 depict various methods performed by the system described above in reference to FIGS. 1-2 according to at least one embodiment. It should be recognized that the methods are examples and that other methods and modifications to the disclosed methods exist and are covered by this disclosure. For example, while FIG. 4 discloses recording a modification, at block 408, before implementation of the associated modification, at block 410, it should be recognized that implementing the modification prior to recordation is also covered by this disclosure.

FIG. 3 is a flowchart of an example method for replaying modifications from a modification history according to one embodiment. The method 300 begins at block 302. At block 302, the trigger detection module 210 detects a trigger. At block 304, the data loader module 204 obtains updated data from a read-only table. At block 306, the data loader module 204 stores the updated data in a modifiable table. At block 308, the modification module 208 retrieves a modification history. At block 310, the modification module 208 applies the modifications indicated by the modification history to the updated data in the modifiable table.

FIG. 4 is a flowchart of another example method 400 for replaying modifications from a modification history according to one embodiment. The method 400 begins at block 402. At block 402, the data loader module 204 of the data management application 109 obtains data from a read-only table. At block 404, the data loader module 204 stores the obtained data in a modifiable table. At block 406, the modification module 208 receives input requesting modification of data in the modifiable table. At block 408, the modification tracking module 206 records the modification requested at block 406 into a modification history. At block 410, the modification module 208 implements the requested modification in the modification table. In some embodiments, blocks 406, 408 and 410 may be repeated for subsequent inputs requesting modification before continuing at block 412.

At block 412, the trigger detection module 210 detects a trigger. At block 414, the data loader module 204 obtains updated data from the read-only table. At block 416, the data loader 204 stores the updated data obtained at block 414 in the modifiable table. At block 418, the modification module 208 retrieves the modification history. At block 420, the modification module 208 implements the modifications recorded in the modification history at block 408 to the updated data stored in the modifiable table at step 416. Depending on the embodiment or system 100 usage, the method 400 may end at block 420, continue at block 406 (e.g. to receive further modification) or continue at block 412 (e.g. to detect another trigger).

FIG. 5 is a flowchart of an example method for editing a modification history according to one embodiment. The method 500 begins at block 502. At block 502, the modification tracking module 206 obtains the modification history. At block 504, the modification tracking module 206 presents the modification history to the user. At block 506, the modification tracking module 206 receives input editing the modification history. At block 508, the modification tracking module 206 edits the modification history based on the input received at block 506. At block 510, the modification tracking module 206 stores the edited modification history as the modification history.

In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that may receive data and commands, and to any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment. In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein may take the form of an entirely hardware implementation, an entirely software implementation, or implementations containing both hardware and software elements. For instance, the technology may be implemented in software, which includes but is not limited to firmware, resident software, microcode, etc.

Furthermore, the technology may take the form of a computer program product accessible from a computer-usable or computer-readable medium providing program code for use by or in connection with a computer or any instruction execution system. For the purposes of this description, a computer-usable or computer readable medium may be any non-transitory storage apparatus that may contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements may include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure may be implemented as software, hardware, firmware, or any combination of the foregoing. Also, wherever a component, an example of which is a module, of the specification is implemented as software, the component may be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
   detecting, using one or more processors, a trigger to obtain updated data from a read-only table, wherein the trigger includes at least one of (a) a modification to the read-only table, (b) a user initiated request to obtain updated data from the read-only table, and (c) an expiration of a predetermined time period;
   obtaining, using one or more processors, the updated data from the read-only table after detecting the trigger;
   storing, using one or more processors, the updated data in a modifiable table;
   retrieving, using one or more processors, a modification history including a comprehensive and persistent record of the changes made to one or more earlier versions of the modifiable table; and
   applying, using one or more processors, the modifications indicated in the modification history, in order from the modification history, to the updated data stored in the modifiable table.

2. The computer-implemented method of claim 1 including:
   receiving a request to modify the data in the modifiable table;
   applying the requested modification to change the data in the modifiable table; and
   recording the modification in the modification history.

3. The computer-implemented method of claim 1, wherein the modification history is a database table separate from the modifiable table in a database.

4. The computer-implemented method of claim 1, wherein the modifiable table uses structured query language and the changes made to the one or more earlier versions of the modifiable table include one or more of an insert statement, a delete statement and a modify statement.

5. The computer-implemented method of claim 1 including:
   responsive to detecting the trigger, locking a previous version of the modifiable table;
   creating the modifiable table;
   responsive to applying the modifications indicated in the modification history to the updated data stored in the modifiable table, deleting the previous version of the modifiable table; and
   renaming the modifiable table to have the same name as the previous version of the modifiable table,
   wherein storing the updated data in the modifiable table includes copying all rows of data from the read-only table into the modifiable table.

6. The computer-implemented method of claim 5, wherein locking the previous version of the modifiable table permits data to be read from the previous version of the modifiable table but prevents further modification of the previous version of the modifiable table.

7. The computer-implemented method of claim 5, wherein the modifiable table is not locked, and subsequent to the modifiable table being renamed, is an unlocked table and requests for modification are applied to the data of the modifiable table.

8. The computer-implemented method of claim 1, wherein the trigger includes the modification to the read-only table.

9. The computer-implemented method of claim 1, wherein the trigger includes the user initiated request to obtain updated data from the read-only table.

10. The computer-implemented method of claim 1, wherein the trigger includes the expiration of the predetermined time period.

11. A computer program product comprising a non-transitory computer usable medium including a computer readable program, wherein the computer readable program when executed on a computing device causes the computing device to:
 detect a trigger to updated data from a read-only table, wherein the trigger includes at least one of (a) a modification to the read-only table, (b) a user initiated request to obtain updated data from the read-only table, and (c) an expiration of a predetermined time period;
 obtain the updated data from the read-only table after detecting the trigger;
 store the updated data in a modifiable table;
 retrieve a modification history including a comprehensive and persistent record of the changes made to one or more earlier versions of the modifiable table; and
 apply the modifications indicated in the modification history, in order from the modification history, to the updated data stored in the modifiable table.

12. A system comprising:
 a processor;
 a memory storing instructions that, when executed, cause the system to:
 detect a trigger to obtain updated data from a read-only table, wherein the trigger includes at least one of (a) a modification to the read-only table, (b) a user initiated request to obtain updated data from the read-only table, and (c) an expiration of a predetermined time period;
 obtain the updated data from the read-only table after detecting the trigger;
 store the updated data in a modifiable table;
 retrieve a modification history including a comprehensive and persistent record of the changes made to one or more earlier versions of the modifiable table; and
 apply the modifications indicated in the modification history, in order from the modification history, to the updated data stored in the modifiable table.

13. The system of claim 12, the memory further storing instructions that, when executed cause the system to:
 receive a request to modify the data in the modifiable table;
 apply the requested modification to change the data in the modifiable table; and
 record the modification in the modification history.

14. The system of claim 12, wherein the modification history is a database table separate from the modifiable table in a database.

15. The system of claim 12, wherein the modifiable table uses structured query language and the changes made to the one or more earlier versions of the modifiable table include one or more of an insert statement, a delete statement and a modify statement.

16. The system of claim 12, the memory further storing instructions that, when executed cause the system to:
 responsive to detecting the trigger, locking a previous version of the modifiable table;
 creating the modifiable table;
 responsive to applying the modifications indicated in the modification history to the updated data stored in the modifiable table, deleting the previous version of the modifiable table; and
 renaming the modifiable table to have the same name as the previous version of the modifiable table,
 wherein storing the updated data in the modifiable table includes copying all rows of data from the read-only table into the modifiable table.

17. The system of claim 16, wherein locking the previous version of the modifiable table permits data to be read from the previous version of the modifiable table but prevents further modification of the previous version of the modifiable table.

18. The system of claim 16, wherein the modifiable table is not locked, and subsequent to the modifiable table being renamed, is an unlocked table and requests for modification are applied to the data of the modifiable table.

* * * * *